July 15, 1924.

J. W. COX

EJECTOR VALVE

Filed April 30, 1920          2 Sheets-Sheet 1

1,501,040

Inventor
James W. Cox
By Rector, Hibben, Davis & Macauley
Attorneys.

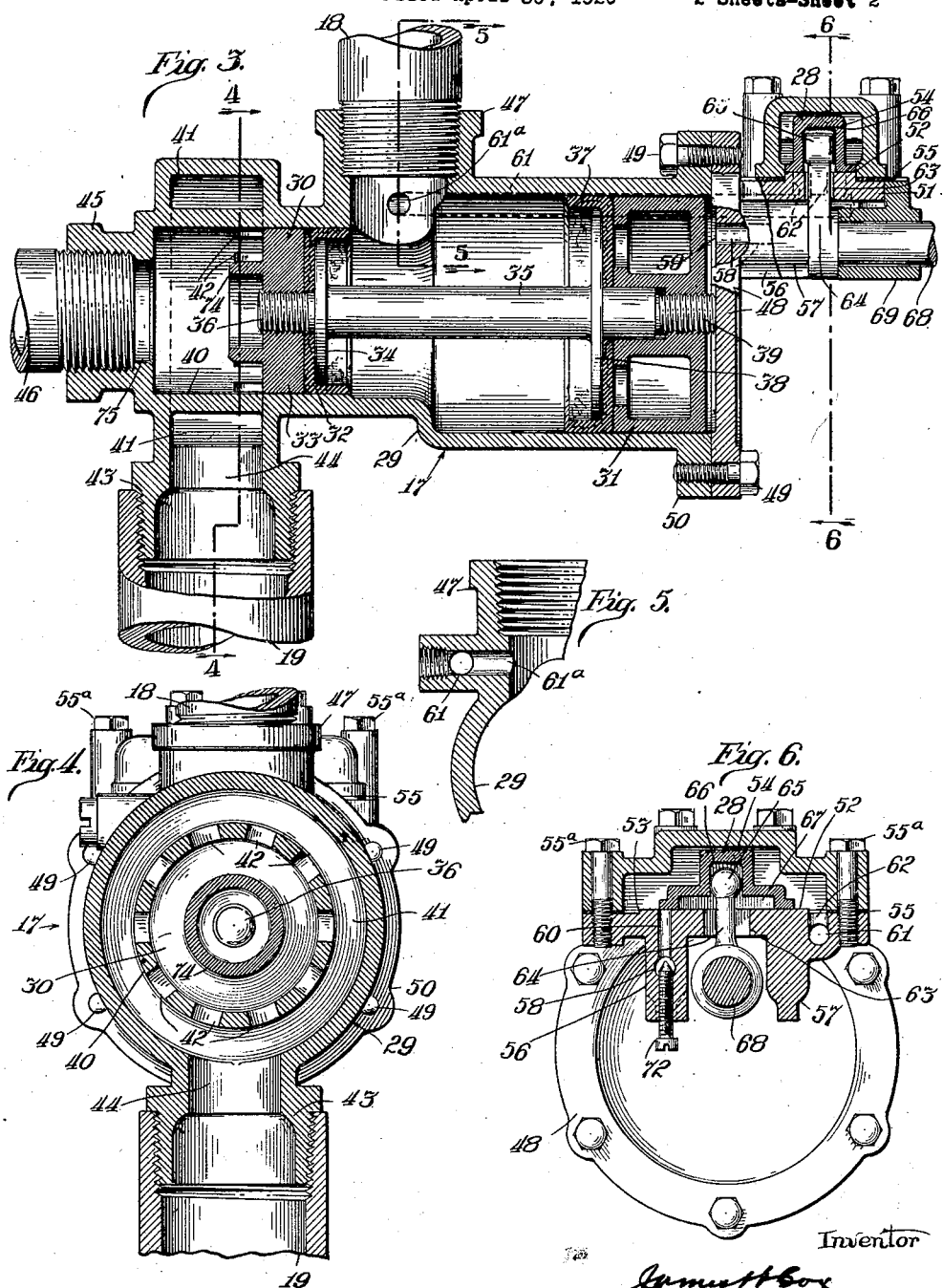

Patented July 15, 1924.

1,501,040

UNITED STATES PATENT OFFICE.

JAMES W. COX, OF WILMETTE, ILLINOIS.

EJECTOR VALVE.

Application filed April 30, 1920. Serial No. 377,958.

*To all whom it may concern:*

Be it known that I, JAMES W. COX, a citizen of the United States, residing at Wilmette, in the county of Cook and State of Illinois, have invented certain new and useful Improvements in Ejector Valves, of which the following is a specification.

The ejector valves to which my invention relates are commonly employed in connection with sewerage systems and my improved valve is particularly adapted thereto. In the sewerage systems for which my valve is designed, where there is no sufficient slope to carry off the sewage, it is common to raise the sewage from a pipe at a lower level to a pipe at a higher level and for this purpose a tank is inserted between the two pipes, which is first permitted to fill with sewage from the pipe at the lower level and then discharged by forcing compressed air in on top of the sewage, suitable valves being interposed in the path of the sewage to prevent its return to the pipe at the lower level and also to prevent its return to the tank from the pipe at the higher level. An automatically acting valve controlled by the level of the sewage in the tank has been employed for the purpose of turning on and off the supply of air and so discharging the tank and permitting it to refill. My invention relates to a valve of this type and has for its object to provide a simple durable valve which will not readily wear out under conditions of use and will dependably control the admission of air to and its exhaust from the tank with a minimum of attention.

Figure 1:
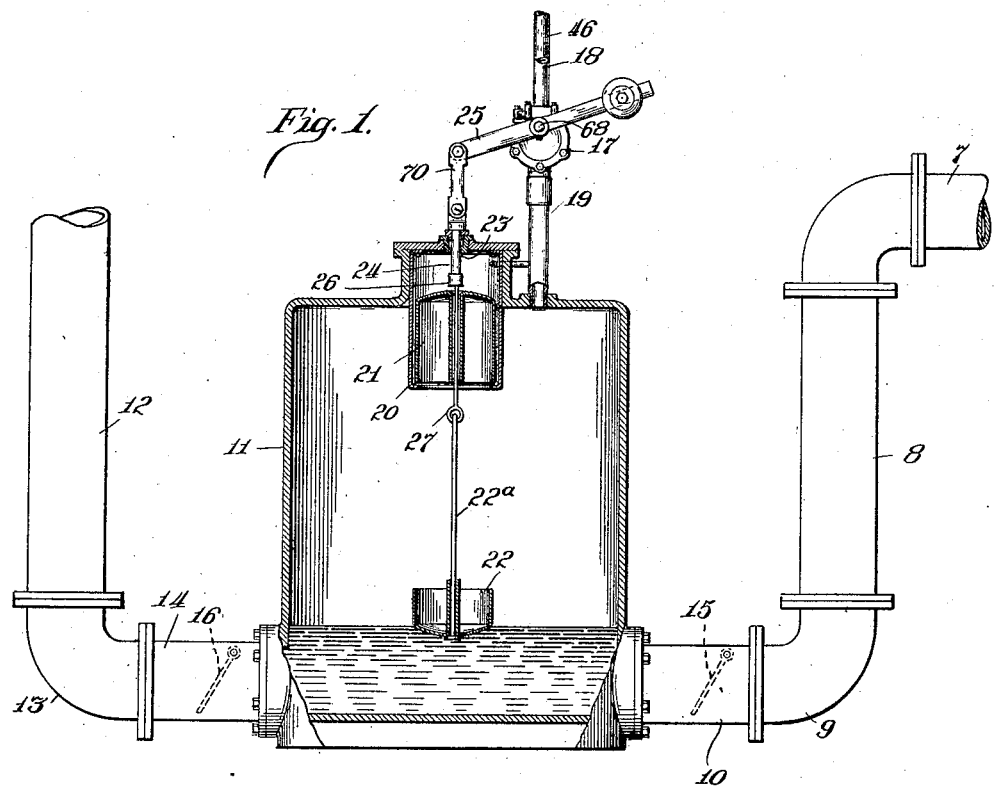
Figure 2:
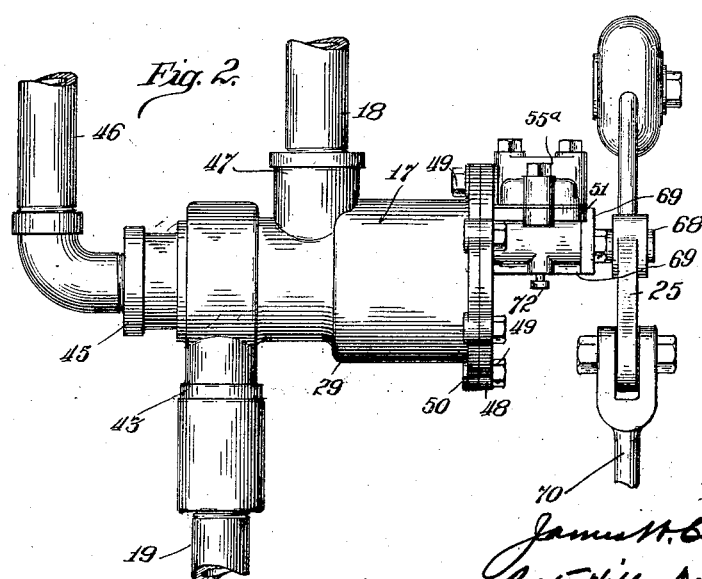

In the accompanying drawing Fig. 1 is an elevation partly in section of a portion of a sewerage system showing a tank such as described above; Fig. 2 is a side elevation of my improved valve; Fig. 3 an axial vertical section thereof parts being shown in elevation; Fig. 4 a transverse section thereof on the line 4—4 of Fig. 3; Fig. 5 a fragmentary transverse section on the line 5—5 of Fig. 3, and Fig. 6 is a transverse vertical section on the line 6—6 of Fig. 3.

Each part is identified by the same reference character wherever it occurs throughout the several views.

Referring first to Fig. 1, the numeral 7 identifies the end of a sewer pipe line at a lower level, 8 a down-comer pipe connected by an elbow 9 and pipe section 10 to the bottom of tank 11, and 12 a riser leading to a sewer pipe at a higher level, said riser 12 being connected to the tank by an elbow 13 and section 14. A swinging check valve 15 is inserted in the pipe section 10 to prevent the back-flow of sewage through pipe 7, and a similar valve 16 is inserted in section 14 to prevent the return of sewage from the riser to the tank.

The air controlling or ejector valve is indicated generally at 17 and comprises a main valve and pilot valve hereinafter more specifically described. It is interposed between a pipe 18 connected to a suitable source of air under pressure and pipe 19 connected to the top of the sealed sewage tank 11. The pilot valve is operated by lever 25 through connections which will be described in detail at a later point of the specification and said lever is actuated by a float and weight in the sewage tank. The lever is connected by link 30 to a rod 24 which reciprocates in a packed opening 23 in the top of the tank and a float 21 has a limited movement on said rod which extends through said float and terminates in an eye 27. Normally the float rests upon a shoulder or inwardly turned flange 20 on a cage 20$^a$ which in the particular form illustrated is mounted in an upwardly extending housing 20$^b$ formed integral with the tank. The rod 24 is formed with a stop or button 26 and when the liquid rises nearly to the top of the tank the float is raised to engage the stop and so lifts the rod and tilts the lever to operate the pilot valve. A bucket 22 is suspended by a rod or wire 22$^a$ from the eye 27. The bucket fills with the sewage when the level of the latter rises sufficiently in the tank and the float is of sufficient capacity to raise the bucket when submerged. The bucket is not of sufficient weight when submerged to tilt the lever 25 even when the rod 24 is no longer pressed upward by the float. As the tank fills therefore the lever remains in the position shown in Fig. 1 until the float 21 exerts sufficient pressure against the abutment 26 to tilt the lever whereupon the pilot valve is shifted to admit air under pressure to the tank as will hereinafter appear. As the air under pressure drives the liquid out of the tank the float resumes its seat on the inturned edge of the cage, there being sufficient length of rod between the abutment 26 and the eye 27 to permit this to take place. The lever 25 is not shifted, however, until the level of the liquid falls sufficiently to substantially uncover the bucket 22 with its contents of liquid when the unsupported weight of the bucket and contents returns the lever 25 to the position shown in Fig. 1. This construction for shifting the lever is well known substantially as described and no claim is made herein thereto.

Referring now more particularly to Figs. 2 to 6 inclusive, my improved valve mechanism comprises a main valve 27 and a pilot or auxiliary slide valve 28. Valve casing 29 is of two diameters, the piston valve proper, 30, sliding in the portion of the casing of smaller diameter and the actuating piston 31 occupying the portion of larger diameter. Both of these pistons have packings of the leather cup variety, packing 32 of the valve being secured between head 33 and a flange 34 upon the valve stem 35, the head 30 being tapped and screwed upon the threaded extension 36 of the rod 35. The cup packing 37 of the piston 31 is clamped between a collar 38 upon the rod 35 and piston head 31 which is tapped and screwed upon the reduced threaded end 39 of the rod 35. The cylindrical reduced portion 40 of the valve casing is surrounded by an annular chamber 41 preferably cast integral therewith and said chamber communicates with the interior of the valve casing by an annular series of ports 42. Chamber 41 communicates with pipe 19 connected to the sewage tank, said chamber being formed with a threaded nipple 43 open to said chamber at 44 and receiving the pipe 19 as clearly shown in Fig. 3. The valve casing is provided at its smaller end with an interiorly threaded nipple 45 which receives the pipe 46 for the air exhaust. Intermediate its ends, at 47, the casing is provided with another interiorly threaded nipple to receive the pipe 18 leading to the compressor or other source of compressed air.

The larger end of the casing is closed by a plate 48 forming part of a casting which also constitutes a support for the pilot or auxiliary valve 28 and associated parts, said plate being secured to the valve casing by bolts 49 extending into the flange 50 of the casing proper. Said casting includes a horizontal flange or shelf 51, the upper surface of which is machined at 52 to form a smooth bearing surface for the valve 28, the edges of the upper surface of said shelf being formed with a slight rabbet 53 which receives the side walls or flanges of the valve housing 54, a packing 55 being interposed between the housing and casting to secure a tight joint. The housing is bolted to the casting by bolts 55ª, and is of suitable internal dimensions to provide an air passage about the slide valve 28. On opposite sides of its center the casting plate 51 is formed with longitudinally extending depending ribs 56, 57 of which rib 56 is formed with a longitudinal bore or passage 58 (see full lines Fig. 6, and dotted lines Fig. 3) which communicates with the interior of the casing at 59 and is plugged at its outer end. A vertical bore 60 affords communication between passage 58 and the interior of the sliding valve housing, as clearly seen in Fig. 6. The chamber of the housing is continuously supplied with air from the body of the main valve casing by a passage 61, (see dotted and full lines Fig. 3 and full lines Fig. 6) formed in the wall of the casing and casting, respectively, plugged at its outer end and communicating with the interior of the slide valve housing by passage 62. Provision is thus made for a supply of air between the operating piston 31 and end plate 48 of the main valve casing through said passages 61, 62, the slide valve housing and passages 60, 58 when the slide valve 28 is in position to permit the air to pass. Casting plate 51 is also formed with an opening 63 substantially in the middle thereof which performs the double function of an exhaust port and an opening through which the operating arm 64 for actuating the valve extends. The upper end of said arm is formed into a rounded or cylindrical head 65 which fits loosely within the chamber or recess 66 formed in the under surface of the slide valve 28 to receive said head, and the under surface of said slide valve is also chambered at 67 to provide a passage for the exhaust of air from bore 60 to the port 63 when the valve is in a proper position, to wit, at the left as the device is viewed in Fig. 6. Arm 64 is keyed upon a shaft 68 which carries at its other end a counter-weighted lever 25 connected to the float and bucket hereinbefore described. Shaft 68 is journaled in a casting 69 which is bolted to the ribs 56, 57 or otherwise secured in proper position on the casting plate 51. Link 70 (Fig. 1) serves to connect the lever 25 with the slide rod 24 carrying the float.

Screw bolt 72 tapped into the rib 56, extends into the passage 58 and may be adjusted to control the effective cross-sectional area of the passage to determine the rapidity of introduction and exhaust of the air to and from the space between the operating piston of the main valve and the end of the valve casing so as to control the rapidity of movement of the valve. The movement of the piston to the right (as viewed in Fig. 3) is cushioned by air trapped between it and the end of the casing. The movement of the valve in the other direction is cushioned by air trapped in an annular chamber formed between the annular flange 74 on the valve head, which is of proper external diameter to loosely fit the exhaust opening 75, on the end of the valve casing. Thus the main valve is cushioned at both ends of its stroke. After emptying and before the sewage begins to flow into the tank from the inlet pipes 7, 8, the main valve has been shifted to the position shown in Fig. 3 and the pilot slide valve occupies a position to the left of that shown in Fig. 6 with the passages 58, 60 in communication with the atmosphere through the port 63. The parts remain in this position until the level of the liquid rises sufficiently to lift the float valve and thereby through the connection heretofore described shift the pilot valve to the right to uncover port 60. As heretofore remarked, the interior of the housing is permanently in communication with the air pressure in the central portion of the main valve casing through passages 61ª, 61 and 62 and air enters behind the piston 31 through port 60 and passage 58, thus balancing said piston. The pressure behind the main valve 30 then shifts the main valve and piston to the left, as viewed in Fig. 3, putting the ports 42 into communication with the body of the main valve casing, thus supplying air under pressure through pipe 19 to the tank. The air pressure drives the sewage out of tank 11, past valve 16 and up the riser 12 to the sewer pipe at the higher level, the level of the sewage in the tank falling until the weight of the bucket 22 and the sewage contained therein, being no longer sufficiently supported by the liquid again shifts the valve operating mechanism to the position shown in Fig. 1, the valve 15 preventing back-flow of liquid to the inlet pipe 8. This movement of the lever 25 under the weight of the bucket 22 and its contents shifts the pilot valve 28 to a position at the left of that shown in Fig. 6 in which communication between passages 58, 60 and the open air is again established through the port 63. The pressure behind the piston 31 is thus reduced to atmospheric and the pressure within the body of the main valve casing moves the main valve and piston to the right to the position shown in Fig. 3 by reason of the difference in pressure areas of the valve and said piston. The air in the tank is then free to exhaust through port 42 to the exhaust outlet pipe 46. Sewage from pipe 7 is thus free to enter the tank past the valve 15 under its hydrostatic head.

The construction is simple, durable and easily maintained in operative condition. By reason of the fact that the valve closes the port 42 during the shift from the position in which the tank is open to atmosphere to that in which it is connected to the pressure, and also during the opposite shift there is no waste of compressed air and this is also true of the operation of the pilot valve, port 60 being closed for a short interval at each shift of the valve. The pounding of the valve on its seat with its attendant noise and wear, common to prior art valves is eliminated. By supporting the float independently of the float rod, when the tank is empty, in this instance by permitting it to rest upon the inturned flange and the cage, the weight of the counterpoise on the lever 25 is reduced and also the wear on the shaft 68.

I claim:

1. In a valve mechanism of the class described, a main valve casing the respective ends of which are of different diameters, a slide valve in the portion of the casing of smaller diameter, a piston in the portion of the casing of larger diameter, a rigid connection between the valve and piston, a connection for the introduction of air under pressure to the casing intermediate the valve and piston, an exhaust port permanently open to the smaller end of the casing, ports controlled by the valve, a connection from the last said port to a point of application of air under pressure, a casting closing the larger end of the main valve casing, said casting comprising a horizontal flange constituting the bottom wall of a pilot valve chamber, a valve housing mounted on said flange, a passage in said casting communicating with the large end of the main valve chamber and ported into the pilot valve chamber, a passage in the casting ported into the pilot valve chamber and communicating with the air connection, an air port through said flange into the valve casing, a pilot valve controlling the communication of the passage between the pilot valve chamber and the main valve casing with the interior of the pilot valve chamber and with the air port respectively, a rock shaft mounted on the casting and an arm projecting from the rock shaft into the valve casing and operating the pilot valve.

2. In a device of the class described, a casing one end of which is of smaller diameter than the other, ports in the portion of the casing of smaller diameter, a piston valve controlling said ports, a connection from said ports to a point of application of air under pressure, an outlet port in the smaller end of said casing, a projection on the piston valve loosely fitting the outlet port and forming an air dash-pot with the casing, a piston in the portion of the casing of larger diameter, a rigid connection between the piston and valve whereby the two move together, a pilot valve, a connection for introducing air under pressure to said pilot valve, a passage connecting said pilot valve with the main valve chamber behind the piston, an exhaust port from said pilot valve chamber, the pilot valve controlling the last said connection, 3. In a device of the class described, a main valve casing of two diameters, an actuating piston in the portion of the casing of larger diameter, a valve sliding in the portion of smaller diameter, ports in the annular wall of the casing controlled by said valve, an outlet port in the end of the casing of smaller diameter than the casing, a projection on the face of the valve loosely entering said port whereby the air compressed between said casing, valve and projection cushions the stroke of the valve, an annular chamber surrounding the ports in the annular wall of the casing, there being an opening from said chamber, a piston in the portion of said casing or larger diameter, an opening in the casing for connection to a supply of compressed air, said opening being intermediate the valve and piston, a pilot valve, a connection from said pilot valve to the main valve casing behind the piston, said pilot valve controlling the last said connection.

JAMES W. COX.